US009195855B2

(12) United States Patent
Colpo et al.

(10) Patent No.: US 9,195,855 B2
(45) Date of Patent: Nov. 24, 2015

(54) DATA PROCESSING LOCK SIGNAL TRANSMISSION

(71) Applicant: International Business Machines Corporation, Armonk, NY (US)

(72) Inventors: Yolanda Colpo, Tucson, AZ (US); John C. Elliott, Tucson, AZ (US); Enrique Q. Garcia, Tucson, AZ (US); Larry Juarez, Tucson, AZ (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

(21) Appl. No.: 13/774,865

(22) Filed: Feb. 22, 2013

(65) Prior Publication Data

US 2014/0244876 A1    Aug. 28, 2014

(51) Int. Cl.
*G06F 21/70* (2013.01)
*G06F 11/22* (2006.01)
*G06F 9/52* (2006.01)

(52) U.S. Cl.
CPC ............... *G06F 21/70* (2013.01); *G06F 9/526* (2013.01); *G06F 11/221* (2013.01)

(58) Field of Classification Search
CPC ...... G06F 9/52; G06F 11/0757; G06F 11/221
USPC ...................... 710/200; 714/4.1, 4.11, 4.5, 43
See application file for complete search history.

(56) References Cited

U.S. PATENT DOCUMENTS

| 6,920,454 | B1 | 7/2005 | Chan |
| 7,058,629 | B1 * | 6/2006 | Colrain et al. ................ 710/200 |
| 7,487,277 | B2 * | 2/2009 | Rinaldi et al. ................ 710/200 |
| 7,673,086 | B2 | 3/2010 | Clark et al. |
| 7,797,292 | B2 | 9/2010 | Clark et al. |
| 8,887,170 | B2 * | 11/2014 | Krauss .......................... 718/104 |
| 2014/0245387 | A1 * | 8/2014 | Colpo et al. .................... 726/3 |

OTHER PUBLICATIONS

Office Action dated Apr. 2, 2015, pp. 9, for U.S. Appl. No. 14/074,626, filed Nov. 13, 2013.
Response dated Jun. 30, 2015, pp. 6, to Office Action dated Apr. 2, 2015, pp. 9, for U.S. Appl. No. 14/074,626, filed Nov. 13, 2013.
Notice of Allowance dated Jul. 17, 2015, pp. 11, for U.S. Appl. No. 14/074,626, filed Nov. 13, 2013.

* cited by examiner

*Primary Examiner* — Glenn A Auve
(74) *Attorney, Agent, or Firm* — William K. Konrad; Konrad Raynes Davda & Victor LLP

(57) ABSTRACT

In accordance with one aspect of the present description, a node of the distributed computing system has multiple communication paths to a data processing resource lock which controls access to shared resources, for example. In this manner, at least one redundant communication path is provided between a node and a data processing resource lock to facilitate reliable transmission of data processing resource lock signals between the node and the data processing resource lock. Other features and aspects may be realized, depending upon the particular application.

10 Claims, 6 Drawing Sheets

DATA PROCESSING LOCK SIGNAL TRANSMISSION

TECHNICAL FIELD

This description relates in general to distributed computing systems, and more particularly, to a method, system and computer program product for facilitating data processing lock access in a distributed computing system.

BACKGROUND

In order to provide for high-throughput of work, or nearly continuous availability, distributed computing systems are often utilized. A distributed computing system typically includes two or more computing devices which frequently operate somewhat autonomously and communicate with each other over a network or other communication path.

A computing device of a distributed computing system that has the capability of sharing resources is often referred to as a cluster which has two or more nodes, each node having a processor or at least a processor resource, and typically, a separate operating system. One example of a distributed computing system utilizing one or more clusters is a storage area network (SAN) which includes a storage controller.

A storage area network is frequently used to couple computer storage devices such as disk arrays, tape libraries, optical jukeboxes or other storage devices, to hosts in a manner which permits the storage devices to appear to the operating systems of the hosts as locally attached to the hosts. In operation, a host may request data from a storage controller which may in turn retrieve the data from one or more storage devices. The host may also transmit data to the storage controller to be written to one or more storage devices.

Each host communicates with the storage controller through a channel path of the storage area network. Each channel path typically includes one or more physical hardware communication channels such as a digital electronic communication bus, a digital optical communication bus, or a similar communication channel. In addition, each channel path may include one or more logical control blocks, addresses, communication devices, digital switches, and the like for coordinating the transmission of digital messages between the host and the storage controller. Fibre Channel (FC) is often used in storage area networks and is a high speed networking technology in which signals may be transmitted over various transmission media including fiber optic cable or twisted pair copper cables, for example.

A storage controller may have multiple servers which are assigned input/output (I/O) tasks by the hosts. The servers are typically interconnected as nodes of one or more clusters in a distributed computing system, in which each node includes a server often referred to as a central electronics complex (CEC) server.

The I/O tasks may be directed to specific volumes in the storage. The storage controller may further have multiple input/output (I/O) adapters such as host adapters which enable the servers to communicate with the hosts, and device adapters which enable the servers of the storage controller to communicate with the storage devices. Switches may be used to couple selected servers to selected I/O adapters of the storage controller.

Various resources of the storage controller including the I/O adapters may be shared among the servers or other nodes of the distributed computing system. A shared resource is typically used by one node of the distributed computing system at a time. Access to a shared resource by the nodes of the distributed computing system is frequently controlled by a "lock" function. A separate embedded hardware lock device often provides the lock function and is coupled by a communication path to each node which may utilize the shared resources associated with the particular lock device.

To gain access to a shared device, a node typically communicates a request over a communication path to the lock device controlling access to the shared resource. If the shared resource is available, the request is granted. Once granted, the requesting node "holds" the lock and the shared resources associated with that lock are assigned to the node holding the lock. In this manner, the node holding the lock "owns" the lock and the shared resources associated with the lock, and may utilize those shared resources to the exclusion of the other nodes which are blocked from accessing the shared resources by the lock device.

Upon completing the task or tasks utilizing the shared resources, the node holding the lock for the shared resources again contacts the lock device and releases the hold on the lock and thus releases the "ownership" of the lock and the associated shared resources. The released lock is then available to be held by another node to gain access to the shared resources of the lock.

In some distributed computing systems, a failover may comprise an event in which a cluster may automatically switch over to one or more backup nodes in the event of a failure of a node. Thus for example, a central electronics complex (CEC) server failover may occur, in which if one CEC server fails, the system performs a failover to another CEC server.

In a failover, a surviving node such as a CEC server node, takes ownership over some or all of the shared resources of the distributed computing system. Access to those shared resources to be taken over as a part of the failover, is frequently controlled by a failover lock provided by a separate hardware lock device, often referred to as a failover lock device. Accordingly, the node performing the failover transmits a request to the failover lock device for ownership of the shared resources associated with the failover lock. If granted, the requesting node holds the lock and is granted access to the shared resources associated with the failover lock. Access by any other node of the distributed computing system, to the shared resources associated with the failover lock, is blocked by the failover lock held by the requesting node. Accordingly, the node holding the failover lock may then complete the failover operation. In this manner, the failover lock provides to the node holding the failover lock exclusive access to the shared resources associated with the failover lock until the holding node releases the failover lock.

Another type of lock used in data processing is a data unit lock. For example, before a first host accesses data through a storage controller or other storage system, the first host may request that the data be locked. For example, the first host may request that specified data such as one or more rows in a data table, one or more tracks of a hard disk drive, or the like be locked. If the first host is granted the lock, the first host may access the specified data without a second host being allowed access to the specified data. The first host has exclusive access to the specified data until the first host releases the lock. For transactions such as airline reservations, credit card transactions, or similar transactions, a lock function is designed to allow a transaction with a first host to be completed before a second host can access the transaction data.

SUMMARY

In one aspect of the present description, operations are described for data processing lock signal transmission, which include under control of a first data processing unit, transmitting by the first data processing unit over a first communication path to a data processing lock device, a first request to be granted a data processing lock, and prior to determining that a communication failure has occurred over the first communication path in connection with the transmission of the first request, transmitting by the first data processing unit over a second communication path to the data processing lock device, a second request to be granted the data processing lock.

A determination may be made as to whether the data processing lock was obtained by the first data processing unit in response to either of the transmissions of the first and second requests to be granted the data processing lock. A further determination may be made as to whether communication failures occurred over both the first and second communication paths in connection with the transmissions of the first and second requests, respectively.

In another aspect of the present description, determining whether communication failures occurred over both the first and second communication paths may include initiating a timeout period to wait for a grant of a requested data processing lock, and determining whether the timeout period has expired prior to receiving a grant of either of the first and second requests to be granted a data processing lock.

In still another aspect, determining whether the data processing lock was obtained may include determining prior to expiration of the timeout period, whether the data processing lock was obtained by the first data processing unit in response to either of the transmissions of the first and second requests to be granted the data processing lock.

In one embodiment, the data processing lock is a data unit lock which controls access to a shared unit of data. In another embodiment, the data processing lock is a data processing resource lock which controls access to a shared hardware resource.

Another aspect of the present description is directed to an operation in which, upon determining that the data processing lock was obtained by the first data processing unit in response to either of the transmissions of the first and second requests to be granted the data processing lock, performing by the first data processing unit a failover which includes accessing shared data processing resources using the data processing lock held by the first data processing unit.

One embodiment of the present description is directed to a first data processing unit which is a server node of a storage controller.

In yet another aspect of the present description, operations further include transmitting by the first data processing unit over the first communication path to the data processing lock device, a first release of a data processing lock granted to the first data processing unit, and prior to determining that a communication failure has occurred over the first communication path in connection with the transmission of the first release, transmitting by the first data processing unit over the second communication path, a second release the data processing lock granted to first data processing unit.

Another aspect is directed to determining whether the data processing lock was released by the first data processing unit in response to either of the transmissions of the first and second releases of the data processing lock, and determining whether communication failures occurred over both the first and second communication paths in connection with the transmissions of the first and second releases, respectively.

In another aspect of the present description, data processing lock signal transmission operations include, under control of a first server node of a distributed computer storage system, transmitting over a first communication path to a shared hardware resource lock device, a first request to be granted a shared hardware resource lock of the hardware resource lock device, determining whether a communication failure has occurred over the first communication path in connection with the transmission of the first request, and upon determining that a communication failure has occurred over the first communication path in connection with the transmission of the first request, transmitting over a second communication path to the shared hardware resource lock device, a second request to be granted the shared hardware resource lock of the shared hardware resource lock device.

Another aspect of the present description is directed to receiving by the server node a grant of a request to be granted the shared hardware resource lock of the shared hardware resource lock device, and performing by the server node a failover which includes accessing shared hardware resources using the shared hardware resource lock held by the server node.

Other features and aspects may be realized, depending upon the particular application.

DETAILED DESCRIPTION

Figure 1:
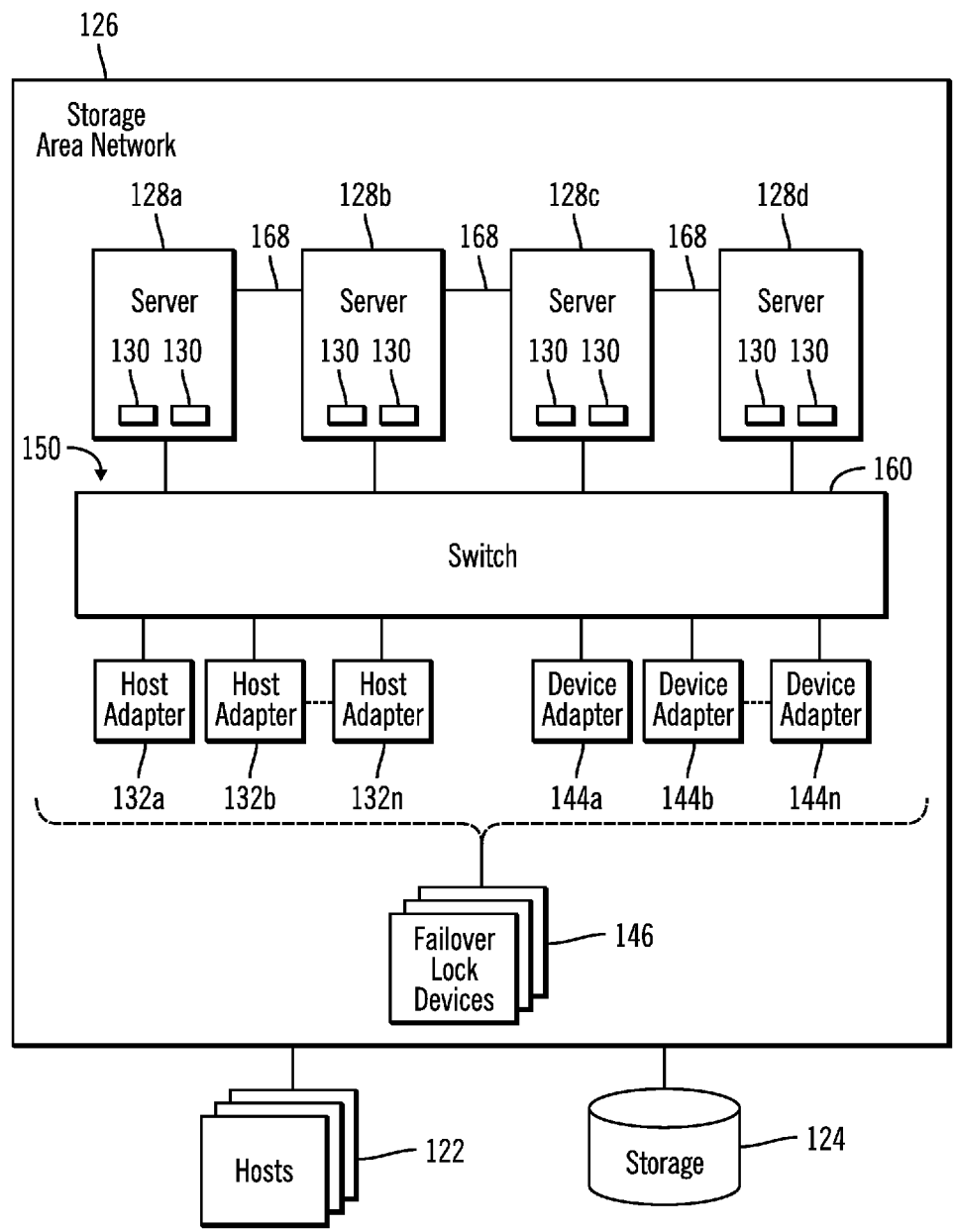
FIG. 1 illustrates a computing environment employing a distributed computing system in accordance with one aspect of the present description.

FIG. 1 shows one example of a distributed computing system in which data processing lock signal transmission in accordance with one embodiment of the present description may be employed. A distributed computing system in accordance with the present description may include a plurality of nodes, which may be provided by various data processing units or computing devices including clusters, controllers and other programmed or dedicated processors. The primary function of the distributed computing system is to provide a data processing function such as, for example, data storage, data backup, data retrieval, data deduplication, data mining, data capture, data archiving, data replication, bandwidth reduced data replication, encryption of data, etc. Other data processing functions may be provided, depending upon the particular application.

In accordance with one aspect of the present description, a node of the distributed computing system has multiple communication paths to a data processing resource lock device which controls access to shared resources, for example. In this manner, at least one redundant communication path is provided between a node and a data processing resource lock device to facilitate reliable transmission of data processing resource lock signals between the node and the data processing resource lock device.

For example, in storage systems that have multiple nodes such as central electronics complex (CEC) servers in a distributed computing system, in the event of the failure of one CEC server, a surviving CEC server may proceed to take over all shared resources of a cluster in a process often referred to as "failover." To do so, a surviving CEC server attempts to take control of a shared resources lock referred to as a "failover lock" so that all other CEC servers will know that it owns the shared resources once it takes over the failover lock.

However, it is appreciated that the surviving CEC server may fail to obtain the failover lock due to a communication failure between the surviving CEC server and the failover lock device which implements the failover lock. As a result, a loss of access to shared resources may occur, disrupting data processing operations.

Similarly, it is appreciated that if a CEC server is unable to release the failover lock due to a communication failure, data processing operations may be disrupted. For example, a CEC server which holds the failover lock may subsequently determine that it needs to reboot or shutdown due to various factors. However, if the CEC server which holds the failover lock is unable to release the failover lock, other CEC servers may be unable to obtain the failover lock and complete the failover process. As a result, the other CEC servers may be prevented from becoming operational.

In accordance with the present description, to increase availability of a distributed computing system such as an enterprise storage system, a second path to a data processing resource lock device such as a hardware failover lock device is provided. Accordingly, when a node such as a CEC server attempts to obtain or release a resource lock such as a failover lock, transmission of the appropriate data processing resource lock signals such a failover lock code may be attempted over all possible communication paths between the node and the lock device. As a result, successful transmission of the data processing resource lock signals may be enhanced. Other features may be realized, depending upon the particular application.

As used herein, data processing locks includes data processing resources locks which control access to shared resources. Shared resources may include shared hardware resources such as host adapters, device adapters, processors, memory etc. Shared resources may also include shared software resources such as program instructions and data structures such as task control blocks (TCBs). The shared resources may further include elements of both hardware and software, and may be physical or virtual or both. Furthermore, some embodiments of the present description are also directed to data processing locks such as data unit locks which control access to units of data which may be stored in a cache, storage device or other memory.

In the environment of FIG. 1, one or more hosts 122 communicate Input/Output (I/O) tasks or other processing requests directed to a storage 124, through a storage area network 126 which manages access to the storage 124. In one embodiment, the storage area network 126 includes a plurality of nodes which in this example, are servers 128a, 128b, 128c, 128d. Each server 128a, 128b, 128c, 128d may be a CEC server which may include one or more processor nodes 130 which share resources and collaborate with each other in performing system tasks. Although the storage area network 126 is depicted as including four servers 128a-128d, for purposes of illustration, it is appreciated that the number of servers or other nodes may be greater or lesser, depending upon the particular application. Similarly, it is appreciated that the number of processor nodes 130 in each server 128a, 128b, 128c, 128d may vary, depending upon the particular application.

Each server 128a, 128b, 128c, 128d may have one or more central processing units (CPUs) in which the processing as well as the memory and other resources of the server may be apportioned into physical or logical partitions (often referred to as a "virtual server"), each of which is capable of running an individual copy of an operating system and performing the service functions of a "server". Hence, each processor node 130 is capable of independently performing data processing functions assigned to that processor node.

Thus, as used herein, the term "server" may be used to refer to a physical server or a logical partition or virtual server performing a server function. Each logical partition separately executes an operating system and device drivers. The logical partitions comprise a division of the processors into logically independent but cooperating processing systems each having their own operating systems and device drivers. Multiple logical partitions may execute in each server 128a-128d, managed by a supervisor module for that server 128a-128d.

Each device driver provides an interface between the operating system in the logical partition in which the device driver executes, and a device, such as an I/O adapter including host adapters 132a, 132b . . . 132n, and device adapters 144a, 144b . . . 144n. The host adapters 132a, 132b . . . 132n, enable the servers 128a-128d to communicate with the hosts 122. The device adapters 144a, 144b . . . 144n enable the servers 128a-128d to communicate with the storage 124. Thus, the servers 128a-128d share devices, such as adapters 132a, 132b . . . 132n, 144a, 144b . . . 144n. Here, the variable "n" is used to represent a variable number of an element, may indicate any number of instances of the element, and may indicate different integer numbers when used with different elements or when used with different instances of the same element. For instance, 132n, 144n, may indicate the same or different number of host adapters 132n, and device adapters 144n.

Access to the various shared devices is controlled by one or more failover lock devices 146. Thus, should a node such as the server 128a wish to access a host adapter such as the adapter 132a, a request is transmitted by the server 128a over a communication path to the appropriate failover lock device 146. If the failover lock device grants the request, the server 128a then "owns" the host adapter 132a and is free to utilize the resources of the host adapter 132a. Conversely, the other nodes such as the servers 128b, 128c and 128d are blocked or "locked out" from access to the host adapter 132a until the server 128a releases the lock controlling access to the host adapter 132a by transmitting a suitable release signal to the failover lock device 146 providing the failover lock which controls access to the host adapter 132a.

The servers 128a-128d communicate with the host adapters 132a, 132b . . . 132n, and the device adapters 144a, 144b . . . 144n, over a fabric 150. The fabric 150 may comprise one or more interfaces providing communication paths between the servers 128a-128d and adapters. A communication path comprises the physical hardware in the fabric 150 that enables communication with shared adapters and lock devices over the fabric.

Each server 128a-128d may be assigned a portion of the adapters 132a, 132b . . . 132n, 144a, 144b . . . 144n during initialization. In the example of FIG. 1, the fabric 150 may include a switch 160 which facilitates sharing of the adapters 132a, 132b . . . 132n, 144a, 144b . . . 144n by each of the servers 128a-128d. The servers 128a-128d may be assigned to handle I/O requests directed to specific volumes configured in the storage 124. The servers 128a-128d communicate over connections 168 enabling processor inter-communication to manage configuring operations performed with respect to the shared devices, such as the shared adapters 132a, 132b . . . 132n, 144a, 144b . . . 144n.

As explained in greater detail below, and in accordance with one aspect of the present description, the fabric 150 also provides a node of the distributed computing system such as the servers 128a, 128b, 128c, 128d, multiple communication paths to a failover lock device 146 which controls access to shared resources such as the adapters 132a, 132b . . . 132n, 144a, 144b . . . 144n. In this manner, at least one redundant communication path is provided between a node and a data processing resource lock device to facilitate reliable transmission of data processing resource lock signals between the node and the data processing resource lock device.

Figure 2:
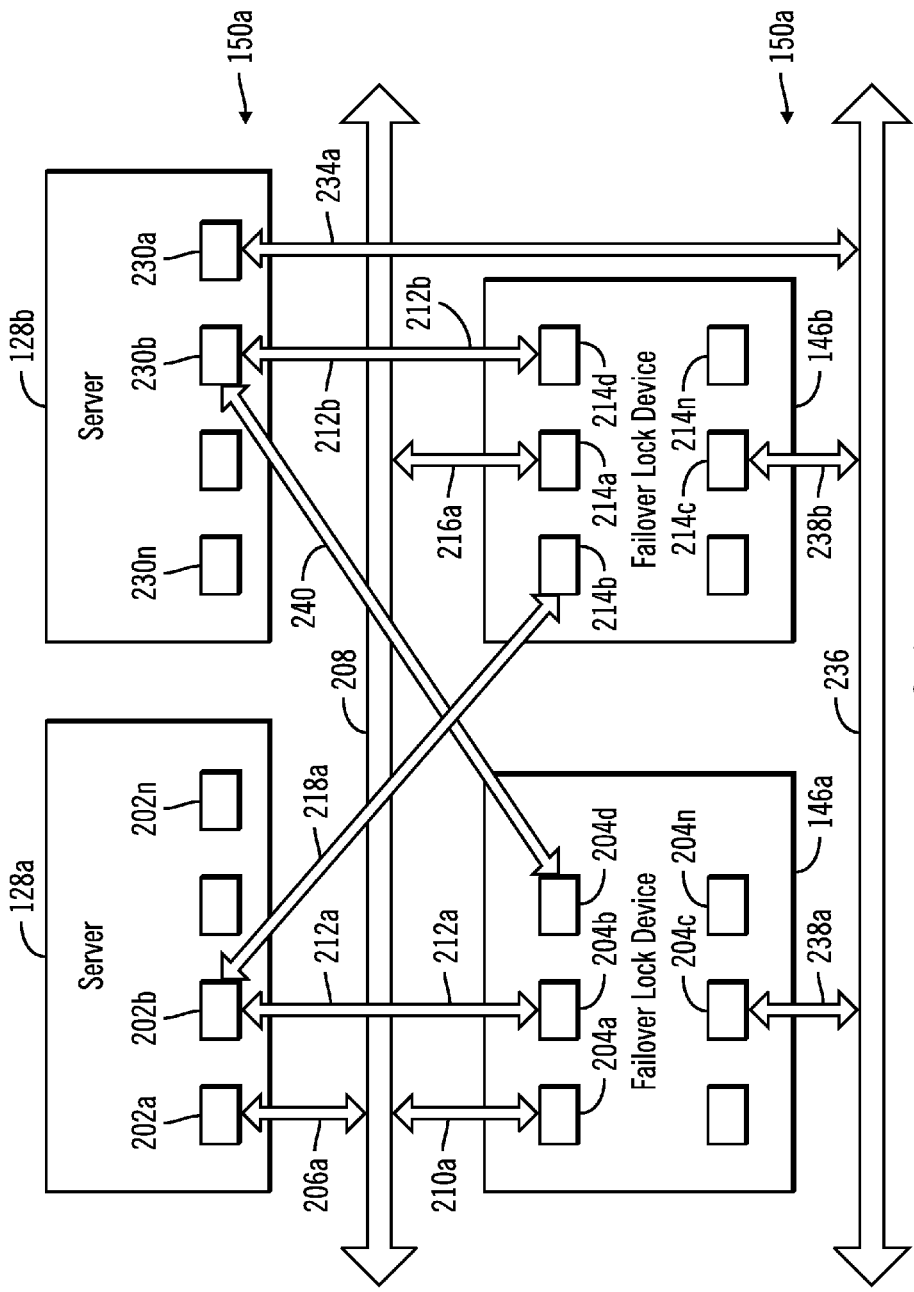
FIG. 2 illustrates a more detailed example of a computing environment having multiple communication paths between a node of the distributed computing system and a data processing resource lock device, in accordance with one aspect of the present description.

FIG. 2 shows examples of a node of a distributed computing system having multiple communication paths to a failover lock device. In this example, the nodes are the servers 128a, 128b, and each is coupled by multiple communication paths of a portion 150a of the fabric 150 to each of the failover lock devices 146a, 146b. However, it is appreciated that other types of nodes of a distributed computing system such as the processor nodes 130 of a server 128a, 128b, 128c, 128d, may in accordance with the present description have multiples paths to other types of data processing lock devices.

In this example, the server 128a has a first communication path from a port 202a to a port 204a of a failover lock device 146a. The first communication path includes a communication path 206a, a communication path 208 and a communication path 210a. In accordance with the present description, the server 128a also has a second, redundant communication path from a port 202b to a port 204b of the failover lock device 146a. The second communication path includes a communication path 212a. Although this embodiment depicts two communication paths between the server 128a and the failover lock device 146a, it is appreciated that a distributed computing system in accordance with the present description may have more than two communication paths for data processing lock signal transmissions between a node and a lock device, depending upon the particular application.

In the illustrated embodiments, the first and second communication paths coupling a node of a distributed computing system to a data processing lock such as a failover lock device, are independent of each other such that a failure of one communication path need not affect the other communication path. Thus, notwithstanding a failure such as a communication hardware or communication software failure in the first communication path, communication of data processing lock signals may yet be accomplished via the second, redundant communication path. 210a.

The fabric 150a may comprise for example, a Fibre Channel arbitrated loop configuration, a serial loop architecture or a bus interface, such as a Peripheral Component Interconnect (PCI) interface such as a PCI-Express interface. The communication paths of the fabric 150a may also be part of an Ethernet network, for example, such that each processor node 130 or server node has an individual network (internet protocol) address. Other types of communication paths may be utilized, such as a modem telephone path, wireless network, etc., depending upon the particular application.

In the illustrated embodiment, communication hardware associated with the communication paths between the nodes and the data processing lock devices includes switches, routers, cables, modems, adapters, power supplies, etc. Communication software associated with the communication paths includes instructions and other software controlling communication protocols and the operation of the communication hardware in accordance with the communication protocols, if any.

In a similar manner, the sever 128a has multiple communication paths to a second data processing lock, the failover lock 146b in this example. Accordingly, the server 128a has a first communication path from the port 202a to a port 214a of the failover lock device 146b. The first communication path to the failover lock 146b includes the communication path 206a, the communication path 208 and a communication path 216a. In accordance with the present description, the server 128a also has a second, independent and redundant communication path from the port 202b to a port 214b of the failover lock device 146b. The second communication path to the second failover lock 146b includes a communication path 218a.

In the illustrated embodiment, the first communication paths between the server 128a and the failover lock devices 146a, 146b, share the server port 202a, the communication path 206a and the communication path 208. Conversely, the second communication path between the server 128a and the failover lock device 146a is the unshared communication path 212a. Similarly, the second communication path between the server 128b and the failover lock device 146b is the unshared communication path 218a. It is appreciated that that the first communication path and the redundant and independent, second communication path between a node and a data processing lock may each include at least a portion of a communication path shared by other nodes or ports or may be a dedicated communication path which is not shared with any other port or node.

Each of the other nodes or servers of the distributed computing system may also have multiple paths to the data processing locks. Thus, similar to the server 128a, the server 128b is shown having a first communication path from a port 230a to a port 204c of the failover lock device 146a. The first communication path includes a communication path 234a, a communication path 236 and a communication path 238a. In accordance with the present description, the server 128b also has a second, redundant communication path from a port 230b to a port 204d of the failover lock device 146a. The second communication path includes a communication path 240.

Similarly, the server 128b is shown having a first communication path from the port 230a to a port 214c of the failover lock device 146b. The first communication path includes the communication path 234a, the communication path 236 and a communication path 238b. In accordance with the present description, the server 128b also has a second, redundant communication path from the port 230b to a port 204d of the failover lock device 146a. The second communication path includes a communication path 240. Although each node is depicted as having a first communication path, and a second redundant communication path to each failover lock device, it is appreciated that a node may have more redundant communication paths to one or more failover lock devices, depending upon the particular application.

Figure 3:
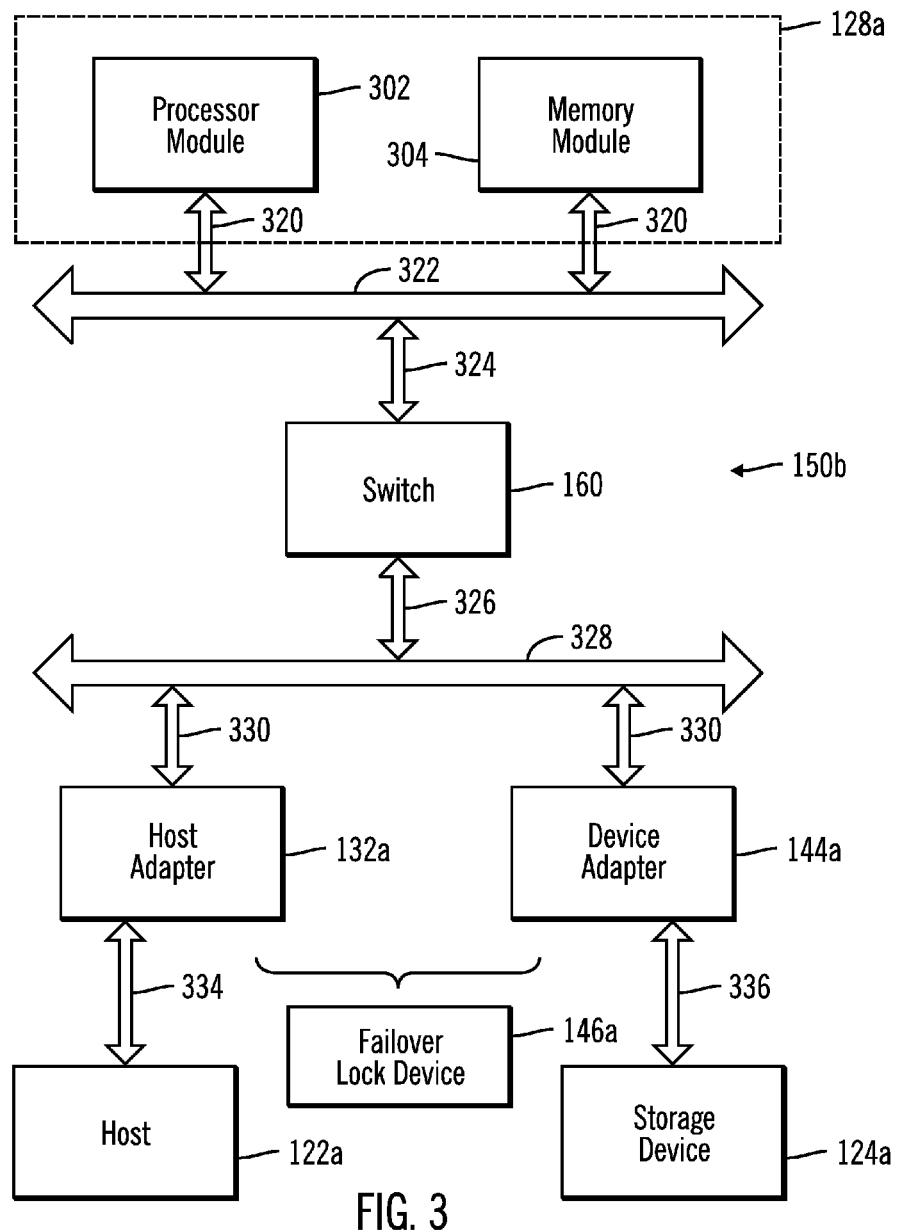
FIG. 3 illustrates an example of a node of the distributed computing system of FIG. 2 having been granted control of shared resources using data processing lock signal transmission in accordance with an aspect of the present description.

FIG. 3 shows one example of a node of a distributed computing system having ownership and therefore access to shared resources including host adapters and device adapters. In this example, the node is a CEC server 128a which includes a processor module 302, and a memory module 304. As previously mentioned, a server may have multiple server partitions, each partition having a physical or virtual processor module 302 and memory module 304 as depicted in FIG. 3.

The memory module 304 stores software instructions and data. The processor module 302 executes the software instructions and manipulates the data in various operations depending upon the particular application. In the illustrated embodiment, the processor module 302 has communicated with a lock device controlling the shared resources, the host adapter 132a and device adapter 144a in this example, and its request to hold the lock for those shared resources has been granted by the lock device. Accordingly, the processor module 302 has been assigned "ownership" of those shared resources and has exclusive access to those shared resources. Access by other nodes to the host adapter 132a and device adapter 144a, is blocked.

The processor module 302 communicates with a host 122a and a storage device 124a through those shared resources over the fabric 150, a portion of which is indicated at 150b. The fabric 150b includes suitable communication paths 320, 322, 324, 326, 328 and 330 which permit the server 128a to communicate with the shared resource adapters assigned to the server 128a, which are, in this example, the host adapter 132a and device adapter 144a. The fabric 150b further may include suitable switches and other fabric devices such as the switch 160.

A host 122a coupled by a communication path 334 to the host adapter 132a assigned to the server 128a, communicates with the server 128a over the communication path 334 and host adapter 132a. Similarly, a storage device 124a coupled by a communication path 336 to the device adapter 144a assigned to the server 128a, communicates with the server 128a over the communication path 336 and the device adapter 144a. In the illustrated embodiment, the servers 128a, 128b, 128c, 128d provide an interface between the communication paths 334 coupled to the hosts 122, and the communication paths 336 coupled to the storage devices 124. Thus, the communication paths 334 to the hosts 122 may be based upon a particular host attachment protocol such as FICON, for example, and the communication paths 335 may be based upon the Fibre Channel protocol, for example. It is appreciated that other communication path protocols may be utilized, depending upon the particular application.

Figure 4:
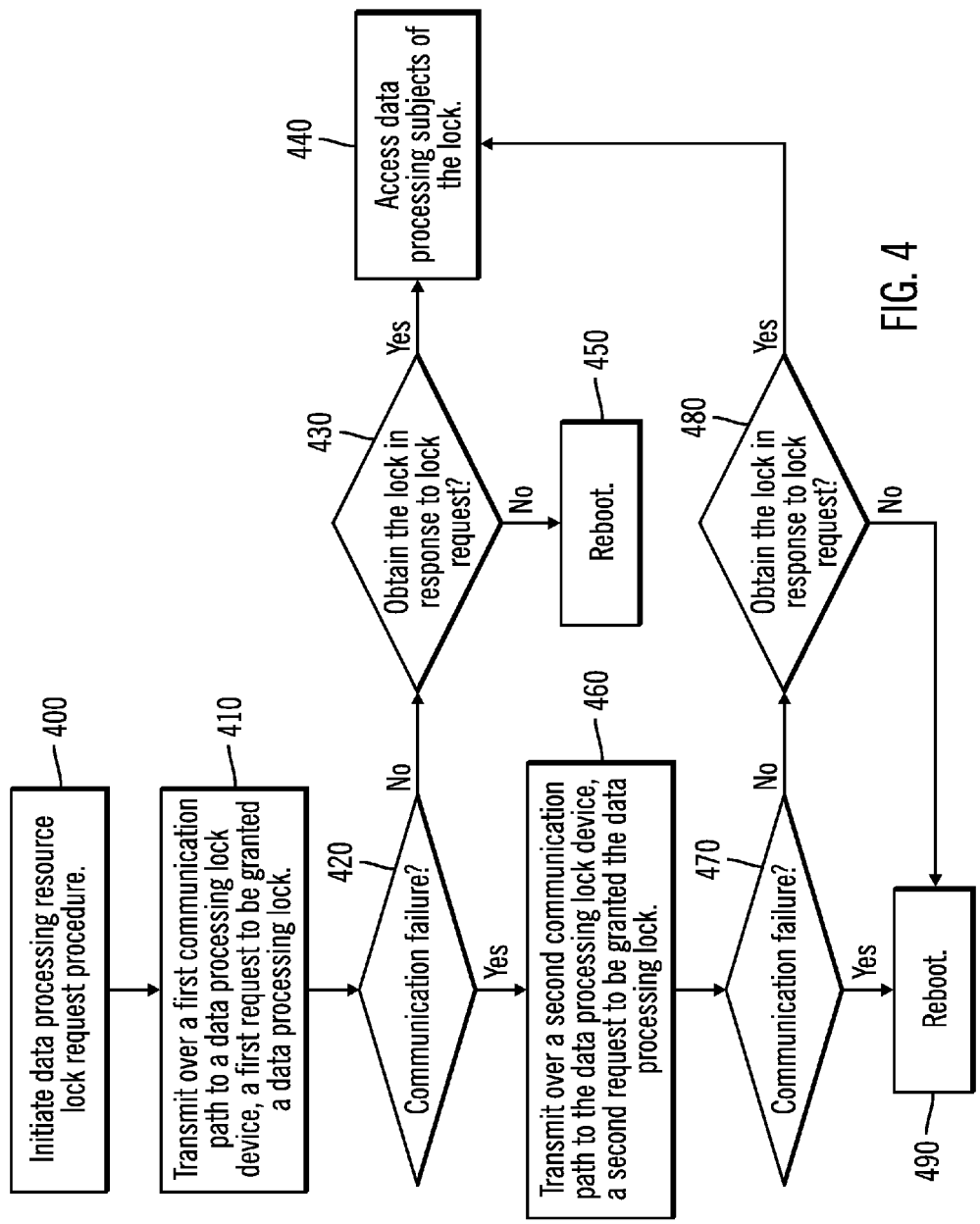
FIG. 4 depicts an example of operations for data processing lock signal transmission in accordance with one aspect of the present description.

FIG. 4 depicts an example of operations for data processing resource lock signal transmission in accordance with one aspect of the present description. In a first operation, a data processing unit initiates (block 400) a data processing resource lock request. In the illustrated embodiment, the CEC server 128a may, for example, in response to failure of another node of the distributed computing system, initiate a failover procedure to take ownership of shared resources such as host adapters and device adapters. It is appreciated that other types of locks for other types of shared resources or shared data may be requested in other circumstances, depending upon the particular application.

The first data processing unit, such as the CEC server 128a, transmits (block 410) over a first communication path to a data processing resource lock device, a first request to be granted access to shared resources controlled by the data processing resource lock. Thus, in the illustrated embodiment, for example, the CEC server 128a may transmit over a first communication path comprising the communication paths 206a, 208, 210a, to a failover lock device 146a, for example, a first request to be granted possession of a data processing resource lock for shared resources for the failover procedure.

A determination is made (block 420) as to whether a communication failure has occurred. For example, a timeout period may be initiated to wait for a response to the request to be granted the data processing resource lock. If a response to the request is received before expiration of the timeout period, it may be determined that no communication failure has occurred over the first communication path. Conversely, upon failure to receive any response to the request within the period, it may be determined that a communication failure has occurred over the first communication path. It is appreciated that other techniques may be used to determine whether a communication failure has occurred over the first communication path.

If a response is received from the data processing resource lock device indicating no communication failure, a determination is made (block 430) as to whether the requested data processing resource lock has been granted by the data processing resource lock device such as the failover lock device 146a. If the request has been granted, the first data processing unit may access (block 440) the subjects of the data processing resource lock and perform operations using those subjects. Thus, the first data processing unit may continue the failover which includes the first data processing unit accessing the shared data processing resources using the shared resource lock held by the first data processing unit. The shared data processing resources for which access is controlled by the failover lock device 146a may include host adapters and device adapters, for example.

Alternatively, if it is determined (block 430) that possession of the requested data processing resource lock has not been granted by the data processing resource lock device, the first data processing unit, in this embodiment, performs a reboot (block 450). For example, the failover lock device may have denied the first processing unit possession of the failover lock because another node of the distributed computing system may have already been granted the failover lock and initiated the failover process. As part of the reboot, the first processing unit may release any data processing locks granted to it. It is appreciated that in other embodiments, other operations may be performed instead of a reboot in response to a denial of the request to be granted the failover lock.

Conversely, if it is determined (block 420) that a communication failure has occurred over the first communication path, the first data processing unit may transmit (block 460) a second request for control of the data processing resource lock over a second communication path to the data processing resource lock device. Thus, in the illustrated embodiment, for example, the CEC server 128a may transmit over a second communication path comprising the communication path 212a to the same failover lock device 146a, for example, a request to be granted possession of the same data processing resource lock for the same shared resources for the same failover procedure.

Again, a determination is made (block 470) as to whether a communication failure has occurred, but this time with respect to the second request transmission over the second, redundant communication path. Again, a timeout period may be initiated to wait for a response to the second request to be granted the data processing resource lock. If a response to the request is received before expiration of the timeout period, it may be determined that no communication failure has occurred over the second communication path. Conversely, upon failure to receive any response to the repeated request within the time period, it may be determined that a communication failure has again occurred but this time over the second, redundant communication path. It is appreciated that other techniques may be used to determine whether a communication failure has occurred over the second communication path.

If a response is received from the data processing resource lock indicating no communication failure, a determination is made (block 480) as to whether the requested data processing resource lock has been granted by the data processing resource lock device such as the failover lock device 146*a*. If the request has been granted, the first data processing unit may access (block 440) the subjects of the data processing resource lock and perform operations using those subjects. Thus, the first data processing unit may continue the failover using the shared data processing resources to which access has been granted by the failover lock device 146*a*. The data processing resources to which access is granted by the failover lock device 146*a* may include host adapters and device adapters, for example.

Alternatively, if it is determined (block 480) that possession of the requested data processing resource lock has not been granted by the data processing resource lock device, the first data processing unit, in this embodiment, performs a reboot (block 490). For example, in one embodiment, the failover lock device 146*a* may have denied the CEC server node 128*a* the failover lock because another node of the distributed computing system may have already been granted the failover lock and initiated the failover process. As part of the reboot, the first processing unit may release any other data processing locks granted it. It is noted that in other embodiments, other operations may be performed instead of a reboot in response to a denial of a request to be granted a failover lock, depending upon the particular application.

It is appreciated herein that failure by a node to release a lock can also hinder data processing operations. For example, if a node which holds a failover lock subsequently determines it needs to reboot or shutdown, the node should in many embodiments, release the failover lock. However, if the node fails to release the failover lock due to a communication failure, another node of the cluster may be prevented from obtaining it. As a result, the other node may be prevented from becoming fully operational, for example.

Thus, in accordance with the present description, it is appreciated herein that a second communication path to a failover hardware lock can facilitate data processing operations both in connection with releasing a failover lock as well as obtaining one. Thus in accordance with the present description, attempts to either obtain or release a failover lock may be made over multiple communication paths between the node and the failover lock device to increase the reliability of those data processing lock signal transmissions.

In one embodiment, transmission of data processing lock signals which include a a release of a granted data processing lock may be performed in a substantially similar fashion as those described above in connection with the transmission of requests to be granted a data processing lock. Accordingly, a release of a data processing lock may be transmitted over a first communication path to the data processing lock device, and if it is determined that a communication failure has occurred in connection the transmission of the first release, a second release of the data processing lock may be transmitted over a second communication path to the data processing lock device.

Figure 5:
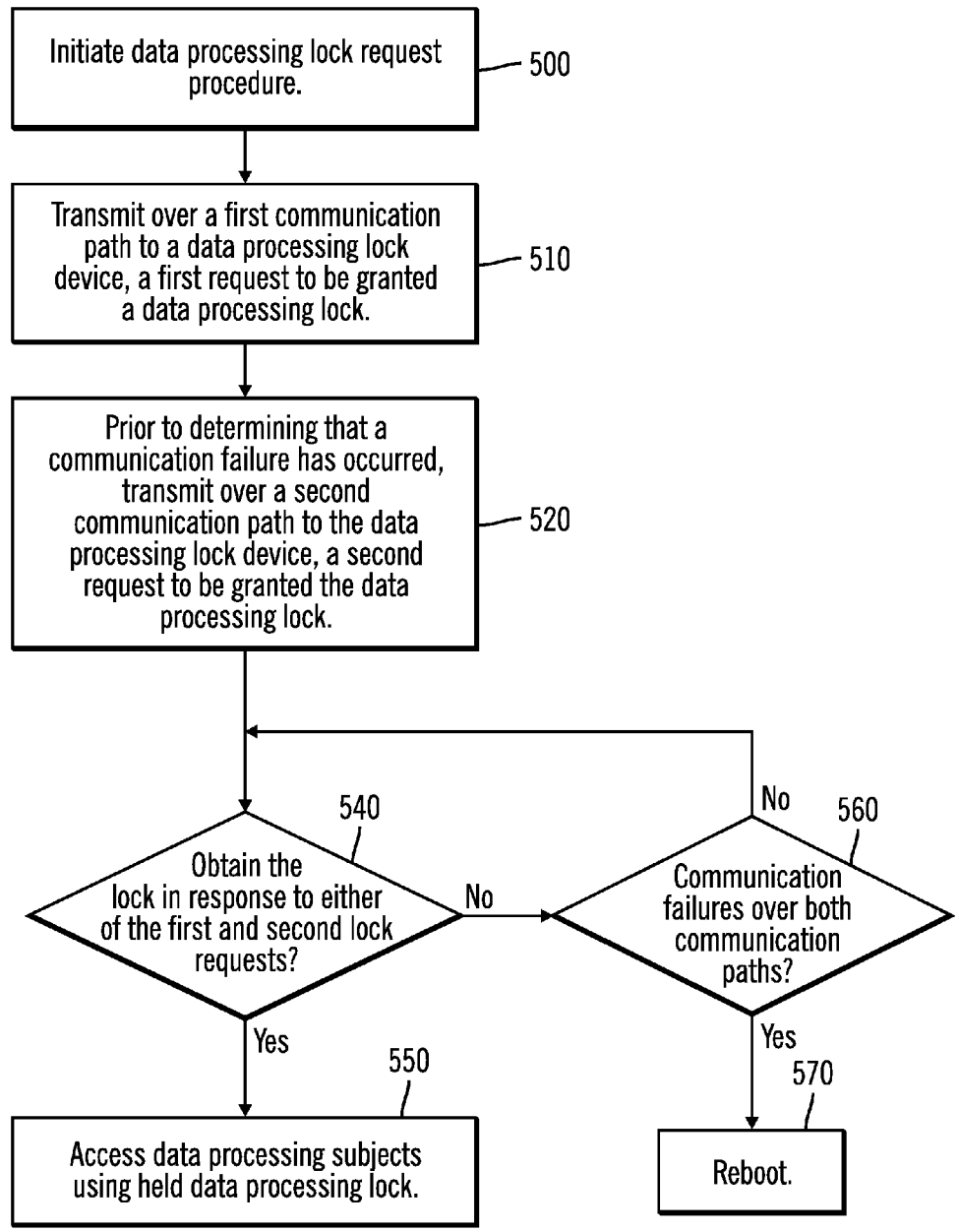
FIG. 5 depicts another example of operations for data processing lock signal transmission in accordance with another aspect of the present description.

FIG. 5 depicts an example of operations for data processing lock signal transmission in accordance with another aspect of the present description. In a first operation, a data processing unit initiates (block 500) a data processing resource lock request procedure. For example, the CEC server 128*a* may in response to failure of another node of the distributed computing system, initiate a failover procedure to gain access to shared resources such as host adapters and device adapters. It is appreciated that other types of data processing locks for other types of shared resources or shared data may be requested in other circumstances, depending upon the particular application.

In another example, the first data processing unit may initiate a procedure for requesting to be granted access to a unit of data. In such an example, access to the unit of data may be controlled by a data processing lock such as a data unit lock, for example. The data processing unit which holds the data unit lock would have access to the unit of data. Other data units which do not hold the data unit lock, would typically be prevented from at least writing to the unit of data which is the subject of the data unit lock.

In this embodiment, the first data processing unit, such as the CEC server 128*a*, transmits (block 510) over a first communication path to a data processing lock device, a first request to be granted possession of a data processing lock for shared resources or shared data. Thus, in the illustrated embodiment, for example, the CEC server 128*a* may transmit over a first communication path comprising the communication paths 206*a*, 208, 210*a*, to a failover lock device 146*a*, for example, a request to be granted possession of a data processing resource lock for shared resources for the failover procedure.

In this embodiment, without first determining whether a communication failure has occurred over the first communication path in connection with the transmission of the first request to be granted the data processing lock, the first data processing unit may transmit (block 520) over a second communication path to the data processing resource lock device, a second request to be granted the data processing lock. Thus, in the illustrated embodiment, for example, the CEC server 128*a* may transmit over a second communication path comprising the communication path 212*a* to the same failover lock device 146*a*, for example, a second request to be granted possession of the same data processing resource lock for the same shared resources for the same failover procedure as that of the first request. In this manner, data processing lock signals may be transmitted in parallel over multiple communication paths in case one of the communication paths has failed.

In one embodiment, the second request for the lock may be transmitted over the second, redundant communication path either simultaneously with the first request or soon thereafter the first request, without first determining whether a communication failure has occurred over the first communication path in connection with the transmission of the first request to be granted the data processing lock. It is appreciated that in some embodiments, by transmitting the second request for the lock over the second, redundant communication path either simultaneously with the first request or soon thereafter the first request, without first determining whether a communication failure has occurred over the first communication path in connection with the transmission of the first request to be granted the data processing lock, efficient data processing may be facilitated. For example, avoiding the delay which may be incurred by waiting for expiration of a timeout period before transmitting the second request may reduce interruptions of data processing operations.

Upon transmitting the first and second requests, a determination may be made (block 540) as to whether either of the first and second requests to be granted the data processing lock has been granted by the data processing lock device such as the failover lock device 146*a*. If either of the requests has been granted, the first data processing unit may access (block 550) the subjects of the data processing resource lock and perform operations using those subjects.

Thus, a first data processing unit such as the CEC server 128a, for example, may continue a failover which includes the CEC server 128a accessing shared hardware resources using the shared hardware resource lock granted to the CEC server 128a. Shared hardware resources for which access is controlled by the failover lock device 146a held by the CEC server 128a may include host adapters and device adapters, for example.

In this embodiment, a failure by the first data processing unit to receive a grant of the lock in response to either of the first and second requests to the data processing lock device may have been the result of communication failures in all of the multiple communication paths between the first data processing unit and the data processing lock device. Accordingly, if it is determined (block 540) that neither request to be granted the requested data processing has been granted by the data processing lock, a determination (block 560) may be made as to whether communication failures have occurred over both the first and second communication paths in connection with the first and second requests, respectively. If not, the first data processing unit continues to determine (block 540) whether it has been granted the lock in response to either of the first and second requests.

In the illustrated embodiment, a timeout period may be initiated to wait for a response to either of the first and second requests to be granted the data processing resource lock. Accordingly, determining (block 560) whether communication failures occurred over both the first and second communication paths may include initiating the timeout period to wait for a grant of the requested data processing lock, and determining whether the timeout period has expired prior to receiving (block 540) a grant of either of the first and second requests to be granted a data processing lock. Similarly, determining (block 540) whether the data processing lock was obtained may include determining prior to expiration of the timeout period indicating communication failures over both communication paths (block 560), whether the data processing lock was obtained (block 540) by the first data processing unit in response to either of the first and second requests to be granted the data processing lock.

If a response to either request is received (block 540) before expiration of the timeout period, it may be determined (block 560) that no communication failure has occurred over both communication paths. Conversely, upon failure to receive (block 540) any response to either of the requests before expiration of the timeout period, it may be determined (block 560) that communication failures have occurred over both the first and second communication paths. It is appreciated that other techniques may be used to determine whether communication failures have occurred over all the communication paths between the processing unit and the data processing lock device.

Upon a determination (block 560) that communication failures have occurred over both the first and second communication paths in connection with the first and second requests, respectively, to be granted the data processing lock, the data processing unit, in this embodiment, performs a reboot (block 570). For example, in one embodiment, the failover lock device 146a may have denied the CEC server node 128a the failover lock because another node of the distributed computing system may have already been granted the failover lock and initiated the failover process. As part of the reboot, the first processing unit may release any data processing locks granted it. It is appreciated that in other embodiments, other operations may be performed instead of a reboot in response to a determination of communication failures over both the first and second communication paths, depending upon the particular application.

In one embodiment, transmission of data processing lock signals which include a release of a granted data processing lock may be performed in a substantially similar fashion as those described above in connection with the transmission of requests to be granted a data processing lock. Accordingly, a release of a granted data processing lock may be transmitted over a first communication path to the data processing lock device, and prior to determining that a communication failure has occurred over the first communication path in connection with the transmission of the first release, a second release of the data processing lock may be transmitted over a second communication path to the data processing lock device. A determination may be made as to whether the data processing lock was released in response to either of the transmissions of the first and second releases of the data processing lock. Conversely, a determination may be made as to whether communication failures occurred over both the first and second communication paths in connection with the transmissions of the first and second releases, respectively.

Figure 6:
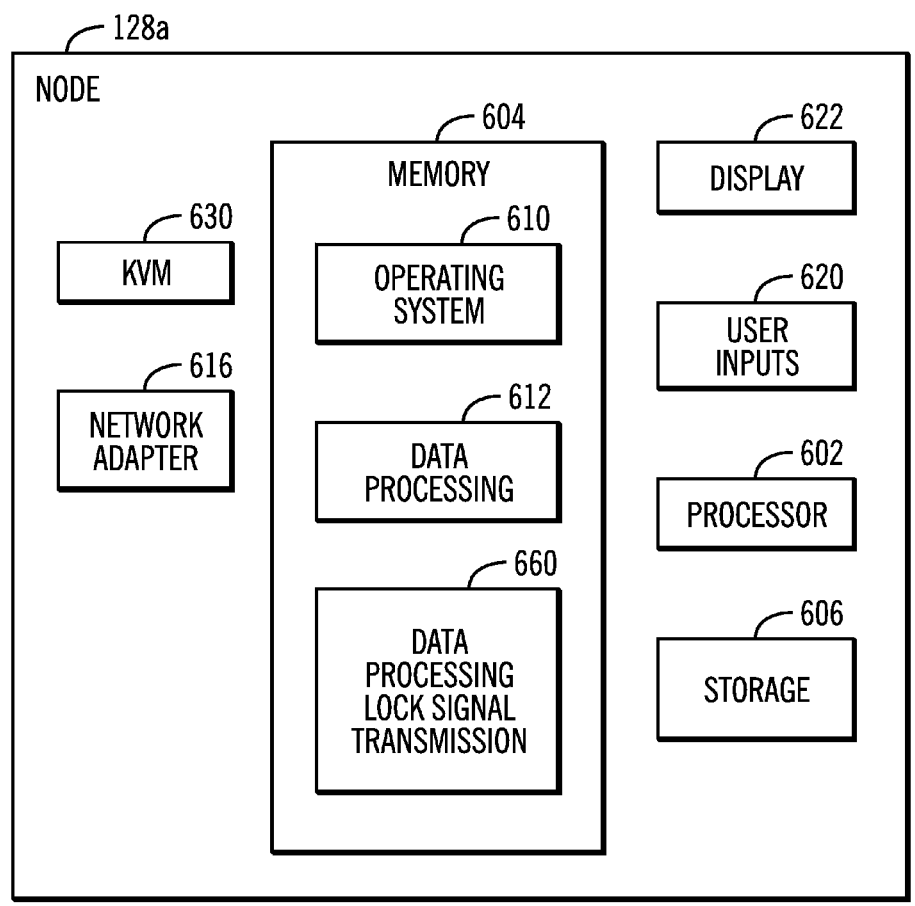
FIG. 6 illustrates an example of a node of a distributed computing system for data processing lock signal transmission in accordance with one aspect of the present description.

FIG. 6 illustrates one embodiment of a node of a distributed computing system such as the storage area network 126 of FIG. 1. In this embodiment, the node is a server node such as the CEC server node 128a. However, it is appreciated that the node of FIG. 6 may comprise any suitable computing device, such as a mainframe, server, personal computer, laptop, handheld computer, telephony device, network appliance, virtualization device, storage controller, etc.

It is appreciated that the nodes of a distributed computing system may perform a variety of data processing functions such as data storage and management in disk arrays, for example. Thus, the node of FIG. 6 may perform data processing tasks such as data backup, data deduplication, data mining data capture, data archiving, data replication, bandwidth reduced data replication, encryption of data, etc and typically involve the transfer of large amounts of data between the hosts 122 and storage 124 (FIG. 1).

The node may include a processor 602 (e.g., a microprocessor), a memory 604 (e.g., a volatile memory device), and storage 606 (e.g., a non-volatile storage, such as magnetic disk drives, optical disk drives, a tape drive, flash storage etc.). The storage 606 may comprise an internal storage device or an attached or network accessible storage. Programs in the storage 606 are loaded into the memory 604 and executed by the processor 602 as represented by an operating system 610 and data processing programs 612. Programs 660 are also provided in the memory 604 for data processing lock signal transmission in accordance with the present description.

The node further includes a network controller or adapter 616 to enable communication with a network such as an Ethernet, a Fibre Channel Arbitrated Loop, etc. which interconnects the nodes of the distributed computing system. The network controller or adapter 616 may also enable communication with a network path to a host 122 or communication with a network path to storage 124.

User input devices 620 provide user input to the processor 602, and may include a keyboard, mouse, pen-stylus, microphone, touch sensitive display screen, or any other suitable activation or input mechanism. Output devices 622 are capable of rendering information transmitted from the processor 602, or other component, such as a display monitor, printer, storage, etc. The input devices 620, and output devices 622 may be coupled directly to a node using a suitable KVM (keyboard, video, mouse) switch 630 in some applications.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, an application specific integrated circuit (ASIC), a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present description may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present description are described above with reference to flowchart illustrations and/or block diagrams of methods, apparatus (systems) and computer program products according to embodiments of the description. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present description(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present description.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present description need not include the device itself.

The illustrated operations of FIGS. 4, 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the description has been presented for the purposes of illustration and description. It is not intended to be exhaustive or to limit the description to the precise form disclosed. Many modifications and variations are possible in light of the above teaching. It is intended that the scope of the description be limited not by this detailed description, but rather by the claims appended hereto. The above specification, examples and data provide a complete description of the manufacture and use of the composition of the description. Since many embodiments of the description may be made without departing from the spirit and scope of the description, the invention resides in the claims herein after appended.

What is claimed is:

1. A computer program product for a distributed computing system having a plurality of processor nodes including a first data processing unit, the computer program product comprising a computer readable storage medium having computer readable program code embodied therein for execution by a processor of the first data processing unit to perform operations, the operations comprising:
    under control of the first data processing unit,
        transmitting by the first data processing unit over a first communication path to a data processing lock device, a first request to be granted a data processing lock,
        prior to determining that a communication failure has occurred over the first communication path in connection with the transmission of the first request;
    transmitting by said first data processing unit over a second communication path to the data processing lock device, a second request to be granted the data processing lock; and
        determining whether the data processing lock was obtained by the first data processing unit in response to either of said transmissions of the first and second requests to be granted the data processing lock; and
        determining whether communication failures occurred over both said first and second communication paths in connection with said transmissions of the first and second requests, respectively.

2. The computer program product of claim 1 wherein said determining whether communication failures occurred over both said first and second communication paths includes initiating a timeout period to wait for a grant of a requested data processing lock, and determining whether the timeout period has expired prior to receiving a grant of either of the first and second requests to be granted a data processing lock, and wherein the determining whether the data processing lock was obtained includes determining prior to expiration of the timeout period, whether the data processing lock was obtained by the first data processing unit in response to either of said transmissions of the first and second requests to be granted the data processing lock.

3. The computer program product of claim 1 wherein the data processing lock is one of a data unit lock which controls access to a shared unit of data, and a data processing resource lock which controls access to a shared hardware resource.

4. The computer program product of claim 1 wherein the operations further comprise upon determining that the data processing lock was obtained by the first data processing unit in response to either of said transmissions of the first and second requests to be granted the data processing lock, performing by the first data processing unit a failover which includes accessing shared data processing resources using the data processing lock held by the first data processing unit.

5. The computer program product of claim 1 wherein the operations further comprise:
    under control of the first data processing unit,
        transmitting by the first data processing unit over the first communication path to the data processing lock device, a first release of a data processing lock granted to the first data processing unit;
        prior to determining that a communication failure has occurred over the first communication path in connection with the transmission of the first release, transmitting by said first data processing unit over the second communication path, a second release the data processing lock granted to first data processing unit; and
        determining whether the data processing lock was released by the first data processing unit in response to either of said transmissions of the first and second releases of the data processing lock; and
        determining whether communication failures occurred over both said first and second communication paths in connection with said transmissions of the first and second releases, respectively.

6. A distributed computing storage controller system for use with a plurality of hosts and a plurality of storage devices, comprising:
    a plurality of processor nodes including a first data processing unit having a processor, said processor nodes for transferring data between the plurality of hosts and the plurality of storage devices;
    a memory having a plurality of units of shared data;
    a plurality of shared resources;
    a data processing lock device providing a data processing lock for controlling access by said plurality of nodes to at least one of said units of shared data and said shared resources;
    first and second communication paths coupling said first data processing unit to said data processing lock device; and
    a computer readable storage medium having computer readable program code embodied therein for execution by the processor of the first data processing unit to perform operations, the operations comprising:

under control of the first data processing unit,
- transmitting by the first data processing unit over the first communication path to the data processing lock device, a first request to be granted the data processing lock,
- prior to determining that a communication failure has occurred over the first communication path in connection with the transmission of the first request; transmitting by said first data processing unit over the second communication path to the data processing lock device, a second request to be granted the data processing lock; and
- determining whether the data processing lock was obtained by the first data processing unit in response to either of said transmissions of the first and second requests to be granted the data processing lock; and
- determining whether communication failures occurred over both said first and second communication paths in connection with said transmissions of the first and second requests, respectively.

7. The storage controller system of claim 6 wherein said determining whether communication failures occurred over both said first and second communication paths includes initiating a timeout period to wait for a grant of a requested data processing lock, and determining whether the timeout period has expired prior to receiving a grant of either of the first and second requests to be granted a data processing lock.

8. The storage controller system of claim 7 wherein the determining whether the data processing lock was obtained includes determining prior to expiration of the timeout period, whether the data processing lock was obtained by the first data processing unit in response to either of said transmissions of the first and second requests to be granted the data processing lock.

9. The storage controller system of claim 6 wherein the operations further comprise upon determining that the data processing lock was obtained by the first data processing unit in response to either of said transmissions of the first and second requests to be granted the data processing lock, performing by the first data processing unit a failover which includes accessing shared data processing resources using the data processing lock held by the first data processing unit.

10. The storage controller system of claim 6 wherein the operations further comprise:
under control of the first data processing unit,
- transmitting by the first data processing unit over the first communication path to the data processing lock device, a first release of a data processing lock granted to the first data processing unit;
- prior to determining that a communication failure has occurred over the first communication path in connection with the transmission of the first release, transmitting by said first data processing unit over the second communication path, a second release the data processing lock granted to first data processing unit; and
- determining whether the data processing lock was released by the first data processing unit in response to either of said transmissions of the first and second releases of the data processing lock; and
- determining whether communication failures occurred over both said first and second communication paths in connection with said transmissions of the first and second releases, respectively.

\* \* \* \* \*